March 24, 1970     L. G. LEWIS     3,502,852
CONTROL COMPUTER FOR A FRACTIONATION COLUMN
Filed April 15, 1966
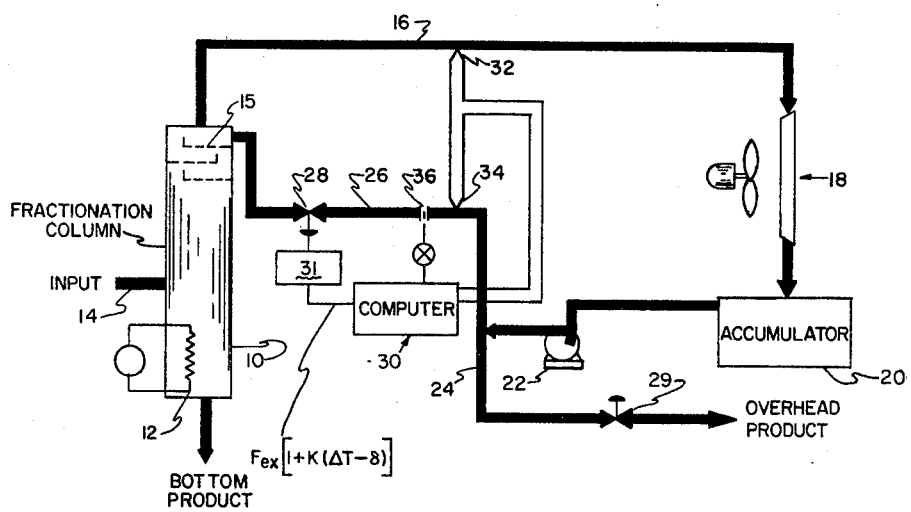
FIG. I
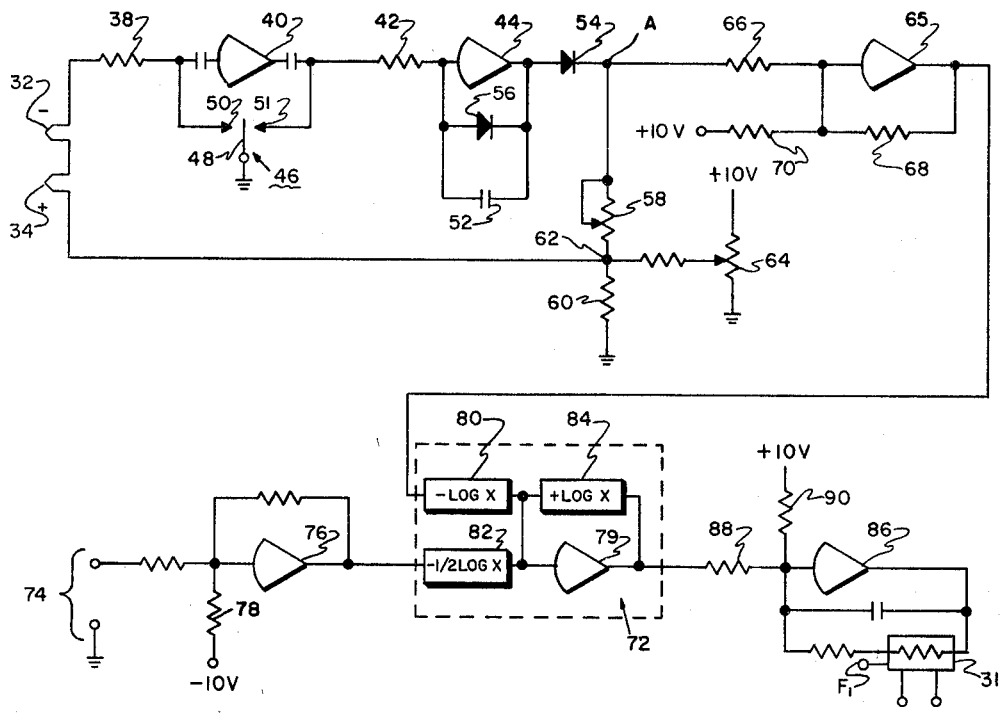
FIG. II
INVENTOR.
LLOYD G. LEWIS
BY
ATTORNEY United States Patent Office 3,502,852
Patented Mar. 24, 1970

3,502,852
CONTROL COMPUTER FOR A FRACTIONATION COLUMN
Lloyd G. Lewis, La Grange, Ill., assignor to Electronic Associates Inc., Long Branch, N.J., a corporation of New Jersey
Continuation-in-part of application Ser. No. 102,914, Mar. 16, 1961. This application Apr. 15, 1966, Ser. No. 549,105
Int. Cl. G06g 7/58, 7/32; B01d 3/42
U.S. Cl. 235—151.12
7 Claims

ABSTRACT OF THE DISCLOSURE

An improved control computer for a fractionation column is disclosed having provision for introducing a factor representing the difference between the dew point of the overhead vapor and the bubble point of the condensed overhead vapor.

---

This invention is a continuation-in-part of application Ser. No. 102,914, filed Mar. 16, 1961, now abandoned.

This invention relates generally to control computers, and, more particularly, to a computer for controlling the flow of external reflux to a fractionation column in order to maintain constant the equivalent flow of bubble point reflux to the column.

The composition of the overhead product obtained from a fractionation column is severely affected by disturbances which may occur in the reboiling and reflux condensing auxiliaries associated with the column. As is well known, the most severe disturbances occur in fractionation columns utilizing air-cooled reflux condensers because the effects of rapidly changing ambient temperatures directly affect column performance. As the use of fractionation columns of this character extends to arid regions which do not have adequate cooling water supplies, the devising of a satisfactory system of control for these columns under rapidly changing ambient temperature conditions is the subject of considerable attention.

One system of control, which helps produce relatively uniform product composition from these columns, manipulates the column's external reflux flow rate in response to the temperature differences which may exist between the column's external reflux and overhead vapor to maintain constant the internal reflux flow rate. Although this system produces reasonably satisfactory results, its operation is premised on the fact that the overhead vapor leaving the column is so pure that for practical purposes its bubble point temperature is equal to its dew point temperature.

In the fractionation of petroleum, the overhead product is seldom if ever a pure substance, and therefore, prior art controllers have been generally inadequate for this use. This inadequacy stems largely from the fact that the temperature difference between the dew point and bubble point of the condensed overhead material leaving the column may vary between a few degrees Fahrenheit and as much as 100 degrees Fahrenheit in dependence on the product being produced. Since this temperature range is essentially the same as the range of expected subcooling which is obtained from the air-cooled reflux condenser, generally inaccurate control of the equivalent flow of bubble point reflux can be expected.

The present invention is directed to a system of control for fractionation columns which do not produce a pure overhead substance, such as, by way of example, a petroleum product. In its preferred form the present control computer regulates the flow of actual external reflux to a column in response to the temperature difference between external reflux and overhead vapor in such a way as to maintain constant the equivalent flow of external reflux at the bubble point temperature.

To this end, suitable transducers provide input signal indications to the present control computer which correspond to the temperature of external reflux, the temperature of the overhead vapor, and the flow rate of the external reflux. Suitable constants and computing elements are provided within the computer for deriving an output signal which is mathematically related to the measured variables and the invariant physical properties of reflux, and suitable for controlling the flow of external reflux to the column. The constants within the control computer may appropriately take the form of manually adjustable potentiometers or the like, with one of these potentiometers preferably corresponding to and representing the temperature difference between the dew point and bubble point of the overhead product.

It is, therefore, an object of this invention to provide a computer capable of controlling the equivalent flow of bubble point reflux to a fractionation column.

Another object of the invention is to provide a computer capable of controlling the equivalent flow of bubble point reflux to a fractionation column, where the product is not a pure substance.

A further object of the invention is to provide a fractionation column control computer which utilizes relatively simple and highly accurate circuit components.

These, and other objects, features, and advantages will be better understood from the following description taken in connection with the accompanying drawing wherein:

FIG. I is a diagrammatic representation of a typical fractionation column utilizing a control computer according to the present invention; and FIG. II is a schematic logical diagram of the present control computer.

Referring now to FIG. I, there is shown schematically a flow diagram of a typical fractionation column 10 which is to be controlled by a computer according to the present invention. The column 10 is considered to be supplied with heat at a constant rate by a suitable heat source 12. A constant flow of product to be fractionated is introduced into the column 10 at an inlet opening 14, and the final product, the composition of which is to be controlled, is obtained as an overhead vapor at the column's top tray 15 via an output conduit 16.

A suitable air-cooled condenser 18 is provided in the conduit 16 for condensing the overhead vapor. A reflux drum 20 is provided at the end of the conduit 16 for accumulating the liquid overhead product. The liquid overhead product is extracted from the drum 20 by a suitable pump 22 and delivered either to an output conduit 24 or to an external reflux conduit 26. The portion of overhead product which flows through the conduit 26 is reintroduced into the column 10 at the top tray 15 as external reflux for further fractionation. A suitable valve means 28, which in the present embodiment may be electrically operated by a coil, not shown, is disposed in the conduit 26 for controlling the rate of flow of the external reflux being introduced into the column 10. Another valve means 29 may be provided in the conduit 24 for purposes of controlling the rate of flow of overhead product being delivered by the column 10.

The equivalent flow of bubble point reflux $F_1$, which may be defined as the mass flow rate of liquid entering the top tray 15 at the bubble point temperature, must be maintained constant in order not to disturb the composition of the overhead product. An expression for $F_1$ in terms of readily measurable and controllable variables is obtained from a material and heat balance on the basis that overhead vapor is condensed on the top tray to warm the external reflux to its bubble point as follows:

$$F_1 = F_{ex}[1 + K(\Delta T - \delta)] \quad (1)$$

where:

$F_{ex}$ = external reflux or mass flow rate of liquid in the conduit 26:

$$K = \frac{C_p}{h_{fg}} = \frac{\text{Specific heat of the external reflux}}{\text{heat of vaporization of the overhead vapor}}$$

$\Delta T$ = temperature difference between the external reflux stream and the overhead vapor stream; and $\delta$ = temperature difference between the dew point of the overhead vapor and the bubble point of the condensed overhead vapor.

Assuming the $F_1$ is to be maintained at a fixed value, K and $\delta$ being invariant and fixed by the desired composition of the overhead product, it can be seen from expression (1) that $F_{ex}$ must be varied in response to variations $\Delta T$. To this end, the computer according to the present invention, which is shown generally at 30 in FIG. I, is seen to deliver a controlling output signal to the valve 28 and to receive input signals from a pair of thermocouples 32, 34 and from a mass flow measuring device 36. Although the present computer 30 is disclosed as an electrical device, it is to be understood that a pneumatic equivalent, or for that matter a hydraulic equivalent of the device would perform equally as well.

The thermocouples 32, 34 are of conventional form and are seen to be disposed respectively in the conduits 16 and 26 for measuring the temperatures of the overhead vapor and the external reflux. Mass flow measuring device 36 may be of any suitable commercially available form and disposed in the conduit 26 for delivering to the computer 30 an electrical input signal which is a function of the mass flow rate of liquid reflux within the conduit 26. Valve 28 is preferably of the type with an orifice opening which is variable in response to the amplitude of an applied electrical signal.

The computer 30 supplies an output signal, variable in amplitude according to the expression $F_e[1+K(\Delta T-\delta)]$ to a commercial available flow controller 31 wherein this signal is compared with a previously determined electrical signal which corresponds to the desired value of $F_1$. An error signal $\Delta F_1$ is obtained from a comparison of these potentials within the controller 31, and thereafter, suitably altered within the controller in accordance with the well known rate, reset and proportional actions which may be provided therein in order to produce a signal which is suitable for application to the valve member 28. Thus, the mass flow rate of external reflux will be regulated by the present controller in order to maintain a constant $F_1$.

In FIG. II, the computer 30 is shown schematically for continuously computing a solution for expression (1) in response to input signals obtained from the thermocouples 32 and 34 and from the mass flow measuring device 36. To this end, the thermocouples 32, 34 are considered to be serially connected in a "bucking" relationship and to deliver a direct current signal to the resistor 38 which is proportional to $\Delta T$, viz, the difference between the values of two temperatures being measured. One end of a resistor 38 is seen to be connected directly to the free end of thermocouple 32 and to have another end capacitance coupled to the input terminal of a conventional A.C. amplifier 40. The output signal obtained from amplifier 40 is capacitance coupled to one end of the resistor 42 and therefrom to the input terminal of another amplifier 44.

Amplifier 40 preferably has a finite high gain, wide band characteristic and is considered to comprise a number of amplification stages so that an applied input signal does not suffer a phase inversion between its input and output terminals. A modulator-demodulator 46 is associated with the amplifier 40 and is seen to comprise an armature 48 and a field coil, not shown, which is supplied with an A.C. potential of suitable frequency, e.g., 100 cycles per second. The modulator-demodulator 46 is provided with a set of contacts 50, 51 which cooperated with the armature 48 to convert a D.C. signal taken from the thermocouples via the resistor 38 into a pulsating D.C. potential having an amplitude proportional to this D.C. signal. Inasmuch as the armature 48 operates contact 51 with respect to ground at 180 degrees out of phase with respect to contact 50, the output signal from amplifier 40 is reconverted to a D.C. potential at the output coupling capacitor, viz, it is demodulated.

Amplifier 44 and the remainder of the amplifiers to be referred to hereinafter are of the type known generally as operational amplifiers, viz, they exhibit characteristics of high gain, wide band width and are stabilized by suitable means such as the well known chopper stabilization circuit, details of which are not essential to an understanding of the present invention. Operating in conjunction with the feedback capacitor 52, the amplifier 44 is known to deliver an output signal which is proportional to the integral of an input signal applied to its input terminals via the resistor 42. The output signal obtained from amplifier 44 need not of necessity be proportional to the integral of the input signal supplied thereto; however, any time lag introduced into the computation by the presence of the capacitor 52 is admirably offset by the attendant filtering of the input D.C. signal.

In the present example, it is assumed that only positive polarity signals are to be utilized from the amplifier 44. Due to the arrangement of circuit components within the circuit here described it is possible to achieve a condition where the output signal from this amplifier assumes a negative polarity. In order to circumvent such an obvious ambiguity, the oppositely poled diode elements 54, 56 are provided at the amplifier output terminals. So long as the output signal from amplifier 44 has a positive polarity, diode 54 will conduct. When, and if, the polarity of the output signal from amplifier 44 becomes negative, the diode 54 will cease to conduct simultaneously, this negative current will be applied to the input terminal of amplifier 44 via the now conducting diode element 56. Since this negative current is in phase opposition to the signal applied to the amplifier via the resistor 42, cancellation of this apparently erroneous signal will result.

The normal positive output signal from amplifier 44 is applied via the diode 54 to the ungrounded end of a voltage divider network comprising a series circuit arrangement of a potentiometer 58 and a fixed resistor 60. In order to prevent circulation of ground currents, the grounded end of the voltage divider may be physically connected to the grounded end of armature 48. The sliding contact of potentiometer 58 is connected to one of its ends and is thereby effective to adjust the resistance ratio of potentiometer 58 relative to resistor 60. The potentiometer 58 is preferably calibrated in terms of the constant K so as to facilitate its manual adjustment to any predetermined value for the overhead product. The junction 62 which is located intermediate the potentiometer 58 and resistor 60 is seen to be connected directly to the free end of thermocouple 34 to complete the balancing network thus far described. The constant $\delta$ is introduced into the computation herein performed by a suitably calibrated potentiometer 64 which is seen to have its sliding contact connected directly to the junction 62 via a fixed resistor, the value of which is very large compared to the value of resistor 60. Potentiometer 64 is further seen to be connected across a source of reference potential which is labeled, ground and +10 v. The constants K and $\delta$ may be determined empirically or by consulting a suitable published tabulation of such values.

The circuit thus far described generates an output signal at amplifier 44 which corresponds to and represents $K(\Delta T - \delta)$ in Expression 1. In order to illustrate the generation of this signal, assume first that the column 10 is in operation and that the potentiometers 58 and 64 have been set to some previously determined initial condition. Responsive to the temperature conditions within the conduits 16 and 26, the thermocouples 32 and 34 will generate a potential which is proportional to $\Delta T$, as previously described. The potential applied to resistor 38 at the input of amplifier 40 will represent the difference between the potential proportional to $\Delta T$ and the potential of junction 62 with respect to ground. Simultaneously, a current signal will flow to ground from +10 v. via the resistor 60, junction 62, the fixed value resistor attached to junction 62, and a portion of the resistor 64. Since this current and the current that flows from the output of amplifier 44 to point A through resistor 58, junction 62 and through resistor 60 are seen to be additive within the resistor 60, it is apparent that the signal at point A will seek a level of amplitude which will produce zero current input signal to amplifier 40. In this manner, junction 62 seeks an amplitude of positive potential with respect to ground which is equal to the amplitude of negative potential produced between the junction of thermocouple 32 and resistor 38 and point 62. With this equality of opposing potential drops, no current flows through the thermocouple and resistor 38. Zero current indicates a condition of balance in the loop comprising amplifiers 40 and 44, diode 54, point A, resistor 58, junction 62 (connected to resistor 64), through the conductor to thermocouples 34 and 32, and then to resistor 38. With this condition of balance, the output signal at point A is equal to $K(\Delta T - \delta)$, where K is determined by the setting of resistor 58 and $\delta$ by resistor 64.

The output signal from point A is next applied to the input terminal of a summing amplifier 65 via an input resistor 66. Amplifier 65 is provided with a feedback resistor 68 and is adapted to receive another input signal of fixed amplitude from a constant potential source, indicated as +10 v., via the resistor 70. The resistors 66, 68 and 70 are appropriately weighted to produce at the output terminal of amplifier 64 an output signal which corresponds to and represents the quantity $[1+K(\Delta T-\delta)]$.

The output signal from amplifier 64 is thereafter multiplied by the quantity $F_{ex}$ within a suitable multiplier 72. To this end, an electrical signal which corresponds to the mass flow rate of external reflux as measured by the flow measuring device 36 is applied to the input terminals 74. This signal is then inverted in polarity by the amplifier 76 to be of the same polarity as the output signal from amplifier 64 and applied to the multiplier 72. In this example, the output from amplifier 76 is considered to always have a negative polarity. Amplifier 76 may also receive an additional fixed amplitude input signal along a resistor 78 for purposes of setting a zero or initial condition of the $F_{ex}$ input signal.

Although multiplier 72 may be of any conventional form, the present embodiment contemplates the use of flow measuring device 36 which produces output signals proportional to the square of the mass flow rate of external reflux. Thus, the multiplier 72 must first obtain the square root of the $F_{ex}$ input signal before performing the multiplication. To this end, the present multiplier 72 utilizes an amplifier 79 operating in conjunction with the input function generators 80, 82 and the feedback function generator 84.

The function generators may be of any conventional form, comprising suitably rated diodes or the like, for producing an output signal which is logarithmically related to an applied input signal, as is well known. More particularly, function generator 80 produces an output signal which is proportional to the log of an applied input signal and function generator 82 produces an output signal which is proportional to ½ the log of an applied input signal. These signals are thereafter summed at the amplifier input terminals and through the operation of the function generator 84, which produces a signal of the summing junction of the amplifier which is proportional to the log of the amplifier output, appear as an output signal having an amplitude equad to $F_{ex}[1+K(\Delta T-\delta)]$.

The output signal, which is now equal to the calculated $F_1$, is thereafter compared to a previously determined $F_1$ input signal shown connected to the flow recorder 31. The internal resistance of the flow recorder 31 may be conveniently incorporated into the feedback network connected in shunt circuit to a summing amplifier 86 for purposes of obtaining a current type input signal which corresponds to the calculated $F_1$. The calculated $F_1$ signal as well as a fixed amplitude biasing signal are shown to be applied directly to the input terminals of amplifier 86 via the resistors 88 and 90.

Within the flow recorder 31 the signals corresponding to the calculated $F_1$ and the predetermined $F_1$ produces an error signal $\Delta F_1$. In a manner well known in the art, the $\Delta F_1$ signal is altered to a composite rate and/or reset and/or proportional signal which is suitable for control of the valve means 28. The flow recorder 31 may further include means for providing a continuous visual indication of the magnitude of $\Delta F_1$ for record purposes. The present control computer continuously and automatically adjusts the position of valve means 28 to maintain a constant $F_1$. Within the limits of accuracy obtainable for the various circuit components utilized, the consistency of equivalent flow rate of bubble point reflux to column 10 may be controlled to acceptable standards.

While only one embodiment of the present invention has been shown and described herein and inasmuch as this invention is subject to many variations, modifications and reversals of parts, it is intended that all matter in the above description be interpreted as illustrative and not in a limiting sense.

I claim:

1. In a fractionation system wherein a feed mixture of two or more components is subjected to a medium which establishes two phases of the feed mixture which are passed in concurrent relationship to one another in a contacting means and wherein at least a part of the constituents removed from said contacting means by way of first fluid connections and is returned to said contacting means as external reflux by way of second fluid connections, having a control system comprising first sensing means in temperature sensing relationship with said first fluid connections for establishing a first output proportional to the temperature of said constituents removed from said contacting means, second sensing means in temperature sensing relationship with said second fluid connections for establishing a second output proportional to the temperature of said constituents returned to said contacting means as external reflux by way of second fluid connections, said first and said second sensing means being connected together so as to produce at an output a first signal proportional to the temperature difference between said first and said second outputs, said second fluid connections including means for measuring the rate of flow of said external reflux to said contacting means by way of said second fluid connections to produce a second signal repersentative thereof, the improvement comprising, means connected to said first and second sensing means to form a conductive active loop to establish at a predetermined amplitude a third signal representative of a temperature difference between the dew point of said constituents removed from said contacting means and the bubble point of said external reflux returning to said contacting means, means including arithmetic means connected to: said output of said first and second sensing means and said flow measuring means, and responsive to the signals produced therefrom to produce a fourth signal representative of bubble point reflux in said contacting means, and flow controller means connected to said arithmetic means and responsive to said fourth signal to vary the flow of said external reflux when the measured bubble point reflux varies thereby to control the operation of said fractionation system to maintain a predetermined separation between said components of said feed mixture.

2. The fractionation system of claim 1 in which said first and second sensing means are thermocouples.

3. In a fractionation system wherein a feed mixture of two or more components is directed to a fractionation column, an overhead vapor stream is removed from said column by way of a first conduit, said overhead vapor stream is cooled to condense at least a part of same, and at least a part of the resultant condensation is returned to said column as external reflux through a second conduit having a control means therein to regulate said flow of external reflux, and including apparatus to compute the equivalent flow of bubble point reflux within said column comprising first sensing means in temperature sensing relationship with said first conduit for establishing a first output proportional to the temperature of said overhead vapor stream, second sensing means in temperature sensing relationship with said second conduit for establishing a second output proportional to the temperature of said external reflux returned to said column by way of said second conduit, said second conduit including means for measuring the flow of external reflux to said column by way of said second conduit to produce a first signal $F_{ex}$ representative thereof, said first and second sensing means being connected in series for producing at an output a second signal $\Delta T$ representative of the temperature difference between said overhead vapor stream and said external reflux, the improvement comprising means to establish at a predetermined amplitude a third signal representative of the temperature difference between the dew point of said overhead vapor stream and the bubble point of said external reflux, variable means to establish a constant signal K at a predetermined value of amplitude, means connecting in order in a conductive loop (1) said first and second sensing means, (2) said variable means, and (3) said third signal establishing means, to produce at a condition of balance of said loop at said output of said comparison means a signal having an amplitude equal to $K(\Delta T-\delta)$, and means including arithmetic means connected to and flow measuring means, and said first and second sensing means to produce a fourth signal $F_1$ representative of the equivalent flow of bubble point reflux to said column, said fourth signal being established from the relationship $F_1 = F_{ex}[1+K(\Delta T-\delta)]$ where K is a constant representative of the specific heat of said external reflux divided by the heat of vaporization of said overhead vapor stream.

4. The fractionation system of claim 3 in which said first sensing means comprises a first thermocouple disposed in said first conduit and said second sensing means comprises a second thermocouple disposed in said second conduit.

5. The fractionation system of claim 3 in which said arithmetic means comprises logarithmic multiplier means.

6. The fractionation system of claim 4 in which said first and second thermocouples are connected in series circuit relationship in said loop with one end of said series circuit being connected to said third signal establishing means.

7. The fractionation system of claim 4 in which said variable means comprises a first potentiometer connected between said output of said first and second thermocouples and a junction, said third signal establishing means comprises a second potentiometer having a reference potential connected across its fixed terminals and a resistor connected between its movable terminal and said junction, an additional resistor connected between said junction and ground, and means connecting said junction to said first and second thermocouples.

References Cited

UNITED STATES PATENTS

| | | | |
|---|---|---|---|
| 3,158,557 | 11/1964 | Tolin | 235—151.12 X |
| 3,020,213 | 2/1962 | Lupfer | 235—151.12 X |
| 3,018,229 | 6/1962 | Morgan | 235—151.12 X |
| 3,158,556 | 11/1964 | Hopper | 235—151.12 |

MALCOLM A. MORRISON, Primary Examiner

E. J. WISE, Assistant Examiner

U.S. Cl. X.R.

202—160